United States Patent
Migdal et al.

(10) Patent No.: US 8,212,835 B1
(45) Date of Patent: Jul. 3, 2012

(54) SYSTEMS AND METHODS FOR SMOOTH TRANSITIONS TO BI-CUBIC MAGNIFICATION

(75) Inventors: Christopher J. Migdal, Cupertino, CA (US); Alexander L. Minkin, Los Altos, CA (US); Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1260 days.

(21) Appl. No.: 11/611,104

(22) Filed: Dec. 14, 2006

(51) Int. Cl.
*G09G 5/00* (2006.01)

(52) U.S. Cl. ........................................ 345/587

(58) Field of Classification Search ................. 345/428, 345/587
See application file for complete search history.

(56) References Cited

U.S. PATENT DOCUMENTS

| | | | |
|---|---|---|---|
| 6,184,894 B1 * | 2/2001 | Rosman et al. | 345/582 |
| 6,288,730 B1 * | 9/2001 | Duluk et al. | 345/552 |
| 6,292,193 B1 * | 9/2001 | Perry et al. | 345/582 |
| 6,304,268 B1 * | 10/2001 | Iourcha et al. | 345/428 |
| 6,356,273 B1 * | 3/2002 | Posniewski et al. | 345/587 |
| 6,417,860 B1 * | 7/2002 | Migdal et al. | 345/582 |
| 2002/0060684 A1 * | 5/2002 | Alcorn et al. | 345/552 |
| 2004/0001069 A1 * | 1/2004 | Snyder et al. | 345/582 |

OTHER PUBLICATIONS

Hadwiger, et al. "Fast and Flexible High-Quality Texture Filtering with Tiled High-Resolution Filters," Proceedings of Vision, Modeling, and Visualization, Nov. 2002.
Office Action, U.S. Appl. No. 11/611,110, dated Jul. 21, 2009.

* cited by examiner

*Primary Examiner* — Edward Martello
(74) *Attorney, Agent, or Firm* — Patterson & Sheridan, LLP

(57) ABSTRACT

One embodiment of the present invention sets forth a technique for transitioning from bilinear sampling to filter-4 sampling, while avoiding the visual artifacts along the boundary between the two different types of filters. The technique may be implemented using a linear transition function or an arbitrary transition function stored in a lookup table. The transition to filter-4 sampling occurs when the view of a textured object includes both minified and magnified levels of texture detail. Using this technique, high image quality is maintained for texture mapped images that include both highly minified pixels as well as highly magnified pixels, without suffering the performance penalty associated with using a filtering operation such as filter-4 sampling across all pixels.

20 Claims, 10 Drawing Sheets

SYSTEMS AND METHODS FOR SMOOTH TRANSITIONS TO BI-CUBIC MAGNIFICATION

BACKGROUND OF THE INVENTION

1. Field of the Invention

Embodiments of the present invention relate generally to computer graphics and more specifically to systems and methods for smooth transitions to bi-cubic magnification.

2. Description of the Related Art

Modern three-dimensional (3D) computer graphics systems typically render one or more 3D graphics images that are either displayed on a computer monitor or stored in memory for later use. The content of a 3D graphics image is generated from a set of 3D geometric objects that are stored and manipulated within a graphics application. The 3D geometric objects may include algorithmically generated shapes, arbitrary shapes, meshes, quads, triangles, lines, points and other related types of objects that may exist within a 3D environment. Three-dimensional geometric objects with non-zero surface area are typically modeled for display using triangles. In fact, 3D objects that are not natively composed of triangles, such as spheres or cylinders, are commonly manipulated in their native form and then tessellated into triangles for display.

While the geometric shapes of 3D objects within a particular graphics scene provide the structure within a 3D image, much of the visual richness and realism associated with modern graphics systems actually results from texturing mapping operations performed on the 3D objects. Texture maps include, without limitation, surface textures and lighting maps. Surface textures represent the color pattern of the surface of an object, such as blades of grass on a lawn or bricks on a brick wall. Lighting maps represent two-dimensional intensity maps of light projected onto an object. Combining different texture mapping effects on 3D objects enables complex color patterns to be applied to an underlying geometric shape, thereby resulting in a greater degree of visual realism. For example, two triangles can be used to form the rectangular shape of a wall within a 3D image. Such a simple rectangular wall is given a much more convincing real-world appearance when a brick wall image is texture mapped onto the two triangles forming the wall. A lighting map may add additional realism by illuminating the surface of the brick wall with a realistic lighting pattern, from a street lamp, for example.

One aspect of rendering a 3D image is the placement of a view port, or camera view, within the 3D scene. The camera view is generally independent of the position of the 3D objects within the scene, thereby allowing the camera to view an object at an arbitrary distance. When the camera is far away from an object, a large number of texture map texels usually map to one screen pixel. To avoid a large computation load associated with filtering the large number of texels to one screen space pixel each time a 3D image is rendered, the texture map is commonly stored in a pre-filtered form known in the art as a MIP ("multum in parvo," or "much in a small space") map.

As is well-known, each MIP map includes pre-filtered versions of the original texture map image, starting with the original (highest) resolution texture map and progressing through a series of lower resolution texture maps. A MIP map commonly includes a set of map images ranging in size from the highest resolution map image (i.e., including the greatest number of texels) down to a map image that is 1×1 texel in size. Each map image within a MIP map is associated with a certain level of detail (LOD). The highest resolution map image available within a MIP map is commonly referred to as map level 0 or "LOD 0." The next lower resolution map image is said to have map level 1, or LOD 1, and so on. The level of detail associated with a particular pixel sampled from a MIP map is commonly determined by the mapping of the pixel-to-pixel sampling gradient within the texel space. That is, an increment of one pixel in either the vertical or horizontal direction in screen space maps to an increment size within the texture map. Texture mapping generally includes selecting an LOD level that approximately matches the screen space pixel stride to a one texel stride within the selected LOD level. The maximum of the vertical and horizontal sampling gradients is one way to select an LOD level. A function that blends the vertical and horizontal sampling gradients is another way to select an LOD level.

Bilinear filtering, also known as "filter-2," is a well-known technique that involves sampling one LOD level of a MIP map using a sampling kernel of 2×2 texels. One weight is applied to each of the four samples, according to the fractional position of the sample point within the set of 2×2 texels. The sum of the four weights adds up to one (1.0) in order to maintain a proper average total intensity for the set of 2×2 texels. The weighted contributions are added together to determine the value of the bilinear sample. Each channel (red, green, blue, alpha) is typically computed independently. Tri-linear filtering is a well-known technique that involves performing a bilinear filter operation on a MIP map at a computed LOD level and again performing a bilinear filter operation on the same MIP map at the next higher LOD level (next lower resolution map image). The bilinear samples from the two LOD levels are then blended together with the blending weights determined by a fractional LOD value. Tri-linear filtering blends bilinear samples together to avoid a visually distinct boundary that may appear on a 3D object between two different LOD levels. While well-known techniques such as bilinear and tri-linear sampling, which use a sampling kernel of 2×2 texels, produce good results for minified samples (i.e., above LOD 0), these techniques produce fairly low quality results when applied to highly magnified texture maps (i.e., below LOD 0). A texture map may become highly magnified if, for example, the camera is positioned very close to a texture mapped object, so that each texel maps to many screen space pixels. Filter-4 filtering uses a 4×4 texel sampling kernel, with weights selected according to the position of the sampling point within the 4×4 region. The weights need not be positive, but should add up to a total of one (1.0). The sixteen texel samples are weighted according to their respective computed weights. A bi-cubic filter is a well-known filter-4 filter that typically produces very high quality results in both minified and highly magnified scenarios.

One solution to improve the quality of texture mapping in the magnified case is to use a technique such as bi-cubic sampling that uses a larger (i.e., 4×4) sampling kernel. However, the consequences of using a larger sampling kernel include a substantial increase in memory bandwidth and potentially a substantial degradation in rendering performance. Most pixels within a typical graphics image are minified, and therefore do not noticeably benefit from such a larger sampling kernel. This solution imposes a performance penalty that applies to all the pixels in a rendered graphics image, even though only a minority of the pixels typically benefit.

As the foregoing illustrates, what is needed in the art is a filtering technique for texture mapping that can be implemented with both minified and magnified texture maps, but without the potential performance penalties associated with using a larger sampling kernel.

SUMMARY OF THE INVENTION

One embodiment of the present invention sets forth a system for performing a tri-linear texture filtering operation. The system includes a memory configured to store a MIP map that includes a first image map and a second image map and a shader unit coupled to the memory. The shader unit is configured to perform a first texture filtering operation using the first image map to compute a first sample value, perform a second texture filtering operation using the second image map to compute a second sample value, where the second texture filtering operation is a different type of texture filtering operation than the first texture filtering operation, and blend the first sample value and the second sample value to produce a final sample value, where a first weight is assigned to the first sample value and a second weight is assigned to the second sample value based on a computed fractional level of detail value.

One advantage of the disclosed system is that it enables a transition from bilinear sampling to filter-4 sampling, while avoiding the visual artifacts along the boundary between the two different types of filters. The transition may be implemented using a linear transition function or an arbitrary transition function stored in a lookup table. The transition to filter-4 sampling occurs when the view of a textured object includes both minified and magnified levels of texture detail. With such an approach, high image quality may be maintained for texture mapped images that include both highly minified pixels as well as highly magnified pixels, without suffering the performance penalty associated with using a filtering operation such as filter-4 sampling across all pixels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
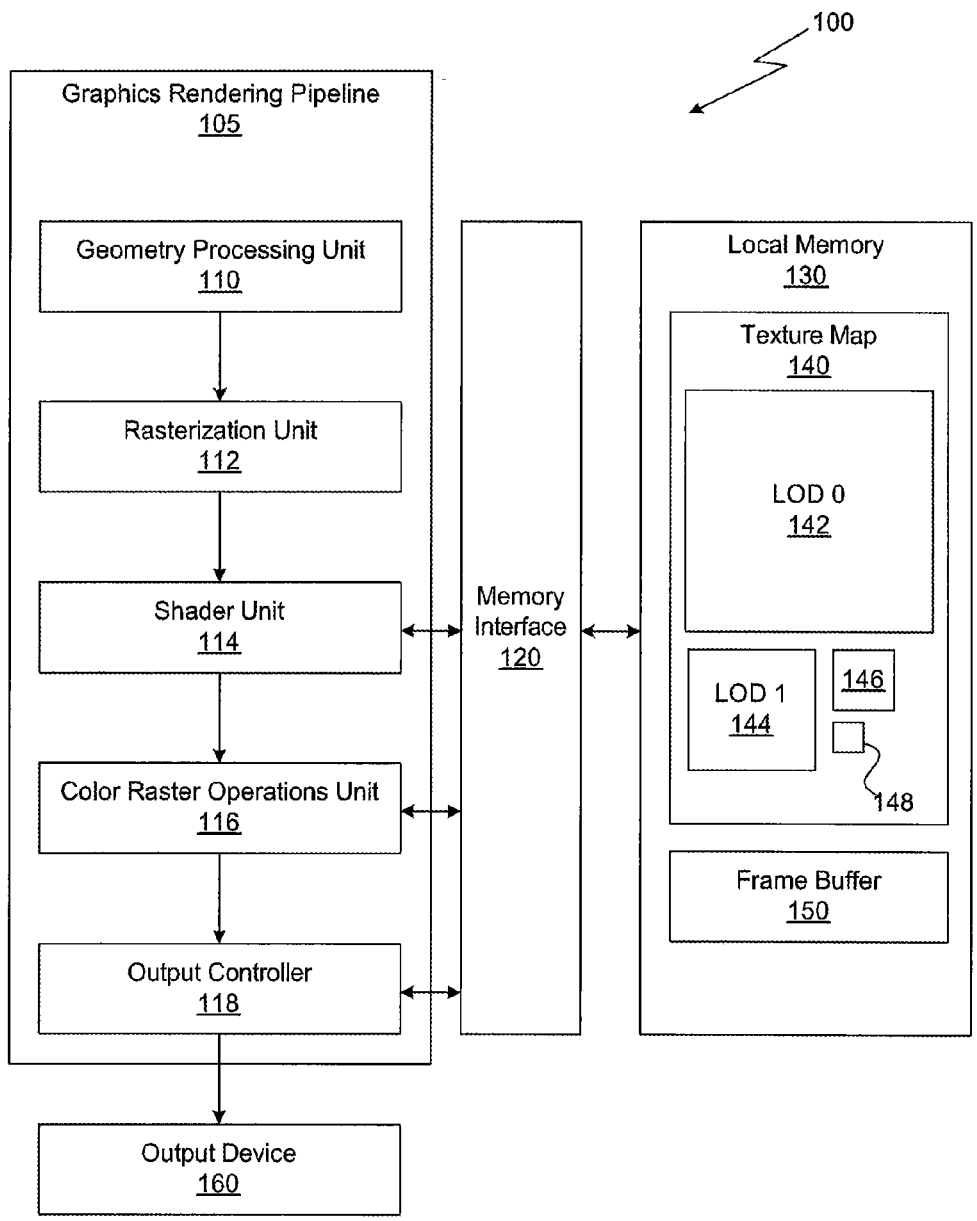
FIG. 1 is a conceptual diagram of a graphics system, according to one embodiment of the invention.

FIG. 1 is a conceptual diagram of a graphics rendering system 100, according to one embodiment of the invention. The graphics rendering system 100 includes, without limitation, a graphics rendering pipeline 105, a memory interface 120, a local memory 130, and an output device 160.

The graphics rendering pipeline 105 includes a geometry processing unit 110, a rasterization unit 112, a shader unit 114, a color raster operations unit 116, and an output controller 118. The geometry processing unit 110 receives geometry primitives, typically triangles, from a graphics application (not shown) and conducts geometric transforms as specified by the graphics application. The output of the geometry processing unit 110 includes triangles transformed and projected onto a two-dimensional surface, referred to as "screen space," corresponding to a window on a viewer's screen. Alternately, a two-dimensional surface in screen space may be used as the destination rendering surface with applications that do not immediately display rendered frame buffer data to a screen. Such applications include, for example, rendering to a video clip that is stored before being viewed. The geometric primitives in screen space generated by the geometry processing unit 110 are transmitted to the rasterization unit 112, which converts the geometric primitives into fragments, corresponding to screen space pixels that are least partially covered by the geometric primitives. In decomposing geometric primitives into fragments, the rasterization unit 112 determines the screen space pixel coverage of each geometric primitive along with the sample coverage of each fragment.

The shader unit 114 receives fragments from the rasterization unit 112 and processes the fragments into shaded pixels, according to shading instructions specified by the graphics application. One type of shading operation performed by the shader unit 114 (sometimes by a texture unit within the shader unit) is texture mapping, whereby texture data stored in the local memory 130 is used to compute the color and transparency values for a shaded pixel. The shaded pixels (pixel fragments) from the shader unit 114 are transmitted to the color raster operations unit 116 for further processing. The color raster operations unit 116 performs any needed blending on the shaded pixels or samples, as specified by the graphics application. The output controller 118 transmits rendered image data to an output device 160, such as an LCD display. Persons skilled in the art will recognize that each unit may include processing capacity for one or more full instances of the processing function for that unit. For example, the shader unit 114 may include multiple shaders capable of simultaneously processing multiple pixels. Furthermore, communication between multiple instances of the units may be provided using a crossbar, ring, or other technically suitable interconnect structure.

The memory interface 120 is integrated in the same device with the graphics rendering pipeline 105 and includes interface logic to communicate with the local memory 130, which is typically off-chip from the memory interface 120. The local memory 130 is typically built from DRAM devices, such as industry standard DDR2 or DDR3 devices.

As shown, the local memory 130 stores a texture map 140 and a frame buffer 150. The texture map 140 includes one or more map images corresponding to different level of detail representations of a full resolution texture map. The full resolution image is stored in the LOD 0 map image 142. The LOD 0 map image 142 is filtered to produce an LOD 1 map image 144, which is lower in resolution in each dimension than the LOD 0 map image 142. The LOD 1 map image 144 is filtered to produce an LOD 2 map image 146, which is lower in resolution in each dimension than the LOD 1 map image 144. The LOD 2 map image 146 is filtered to produce an LOD 3 map image 148, which is lower in resolution in each dimension than the LOD 2 map image 146. The map image resolution corresponding to each successive LOD level is typically, but not necessarily, scaled to half the resolution of the previous LOD level in each dimension. For example, if the LOD 0 map image 142 is 8×8 texels in size, then the LOD 1 map image 144 is 4×4 texels in size, and the LOD 2 map image 146 is 2×2 texels in size. If the aspect ratio of the full resolution texture map is not one-to-one (i.e., not a square image), then when the smaller dimension is reduced to one texel in size, that smaller dimension is defined as remaining one texel in size through any further reductions in map resolution. For example, a 256×4 map reduces to a resolution of 128×2, 64×1, 32×1, and so on. The frame buffer 150 typically stores rendered image data for display or storage.

Figure 2:
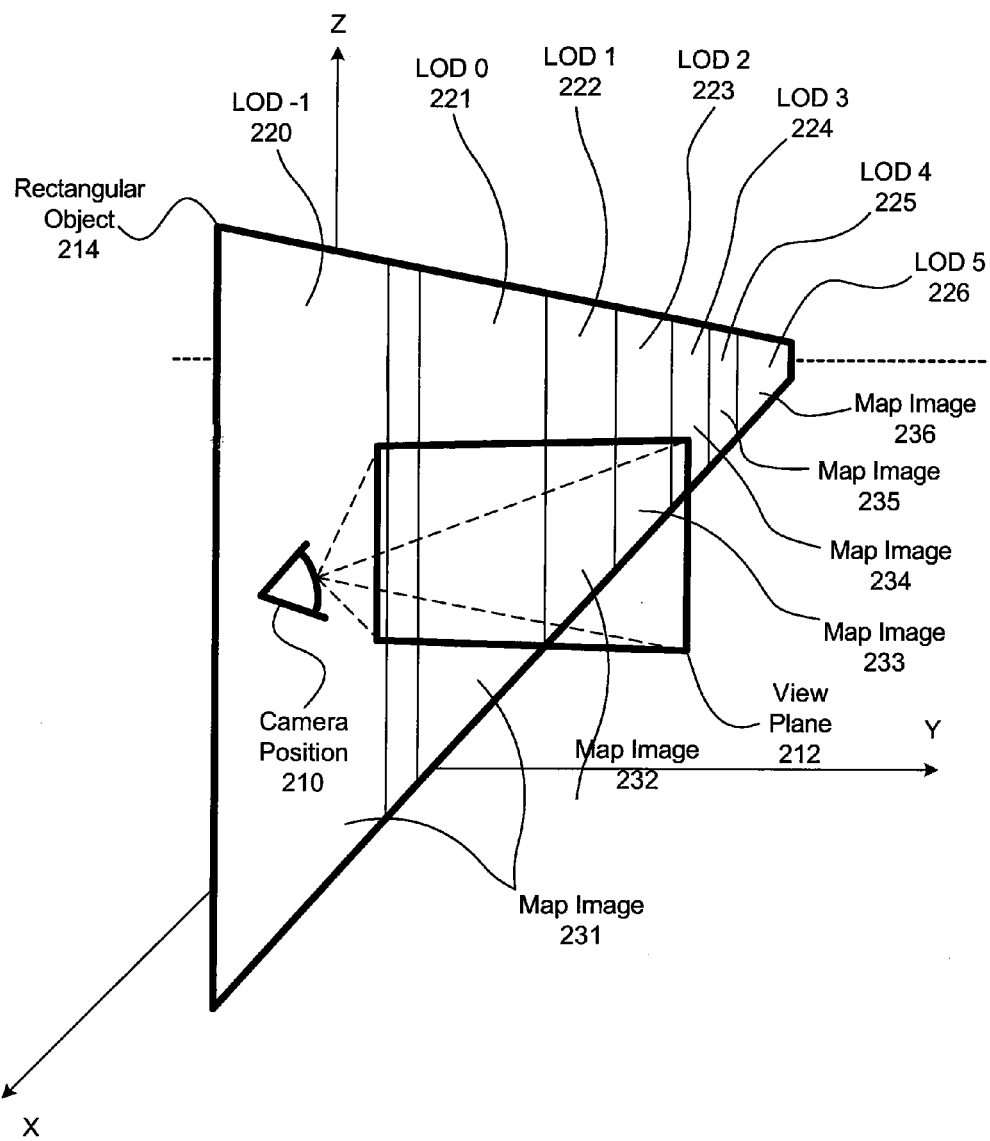
FIG. 2 illustrates the concept of levels of detail in a texture mapping operation and performing a tri-linear filtering operation across a minified map image and a magnified map image.

FIG. 2 illustrates the concept of levels of detail in a texture mapping operation and performing a tri-linear filtering operation across a minified map image and a magnified map image. A rectangular object 214 is texture mapped using a MIP map that includes a sequence of map images 231 through 236. Map image 231 is the highest resolution map image within the MIP map and corresponds to LOD 0 221, LOD −1 220, and any additional negative LOD values. Map image 236 is the lowest resolution map image within the MIP map and corresponds to LOD 5 226. A camera position 210 establishes a view plane 212 that includes a viewing perspective of the rectangular object 214. As shown, the viewing perspective of the rectangular object 214 includes pixels that range from minified through magnified. As the distance from the view plane 212 to the rectangular object 214 increases, the LOD level increases. Here, it is assumed that the minified pixels are computed from map images 231 to 236 (i.e., corresponding to LODs 221, 222, 223, 224, 225, and 226 to the right of the view plane 212), and the magnified pixels are computed from map image 231 (i.e., corresponding to the LOD to the left of the view plane 212). When the texture map is magnified, one texel within map image 231 is typically magnified to cover multiple pixels. In other words, multiple adjacent pixels within a screen space region may map to the same texel within map image 231.

Figure 3A:
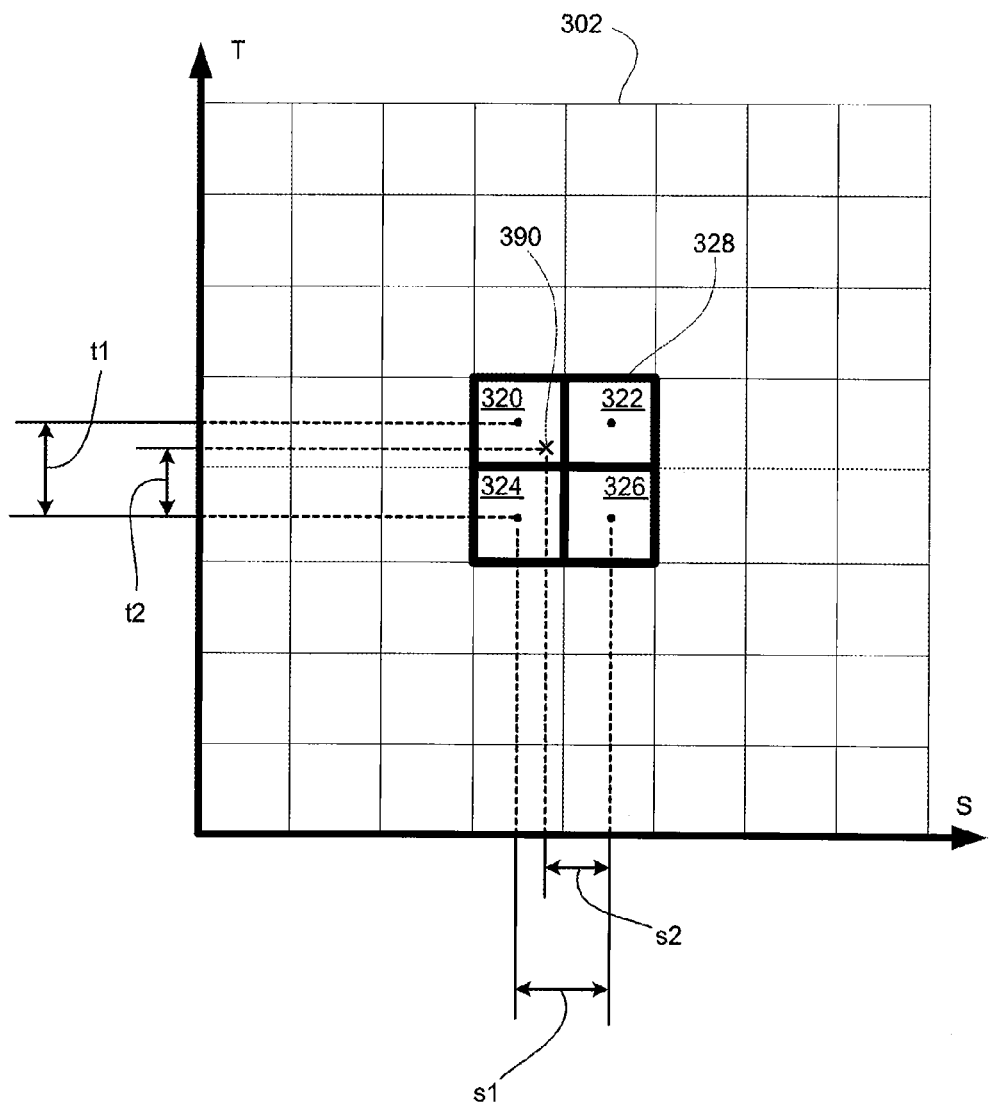
FIG. 3A illustrates a bilinear sampling operation, according to one embodiment of the invention.

As previously discussed, tri-linear filtering blends a bilinear sample from one LOD level and a bilinear sample from the next higher LOD level (i.e., the next lower resolution image map). The transition from the one LOD to the next may take place over many pixels. When the texture is magnified, indicated by a negative LOD value, bilinear sampling is typically used rather than tri-linear sampling. Highly magnified bilinear sampling oftentimes results in poor image quality. Specifically, when a texture is magnified using bilinear filtering, the resulting image appears to be spiky and blocky, which is typically undesirable and detracts from the overall image quality. Filter-4 filtering, such as bi-cubic filtering, can produce high quality results that are generally free of spiky and blocky artifacts, even in highly magnified scenarios. However, the visual character of pixels generated using filter-4 sampling is quite different than the visual character of pixels generated using bilinear or tri-linear filtering, leading to visual artifacts along the boundary between pixels generated using filter-4 and bilinear (or tri-linear) filtering. Thus, simply switching between filters results in visual artifacts that detract from overall image quality.bilinearbilinearbilinear FIG. 3A illustrates a bilinear sampling operation, according to one embodiment of the invention. A map image 302 includes a set of texels, for example texels 320, 322, 324 and 326, organized in a two-dimensional grid that includes a horizontal dimension of "s" and a vertical dimension of "t." A sample point 390 defines the location of a 2×2 sampling kernel 328 such that the sample point 390 is surrounded by four texels 320, 322, 324 and 326. The sample point 390 is a distance s2 from the center of texels 322 and 326 along the s-axis and a distance of t2 from the center of texels 324 and 326. The texel-to-texel distance is defined by s1 in the horizontal direction and t1 in the vertical direction. A bilinear sample value is assigned to the sample point 390 in a two-stage interpolation function. The sample value may be a single scalar value, such as intensity, or a vector that includes, for example, red, green, blue and alpha. Each red, green, blue and alpha channel within a vector is computed independently. The first stage interpolates between texels along the s-axis to yield two interpolated values. The second stage interpolates along the t-axis between the two values interpolated along the s-axis. If s_weight is defined to be the distance s2, then the s-axis contribution of texels 320 and 324 is proportional to s_weight, while the s-axis contribution of texels 322 and 326 is proportional to 1−s_weight. Interpolating between texels 320 and 322 yields a value, v01, while interpolating between texels 324 and 326 yields a value, v02. If t_weight is defined to be the distance t2, then the t-axis contribution of v01 to the bilinear sample value is proportional to t_weight, and the t-axis contribution of v02 to the bilinear sample value is proportional to 1−t_weight. Again, each channel associated with the bilinear sample value is computed independently, but according to the same weighted interpolation.

Figure 3B:
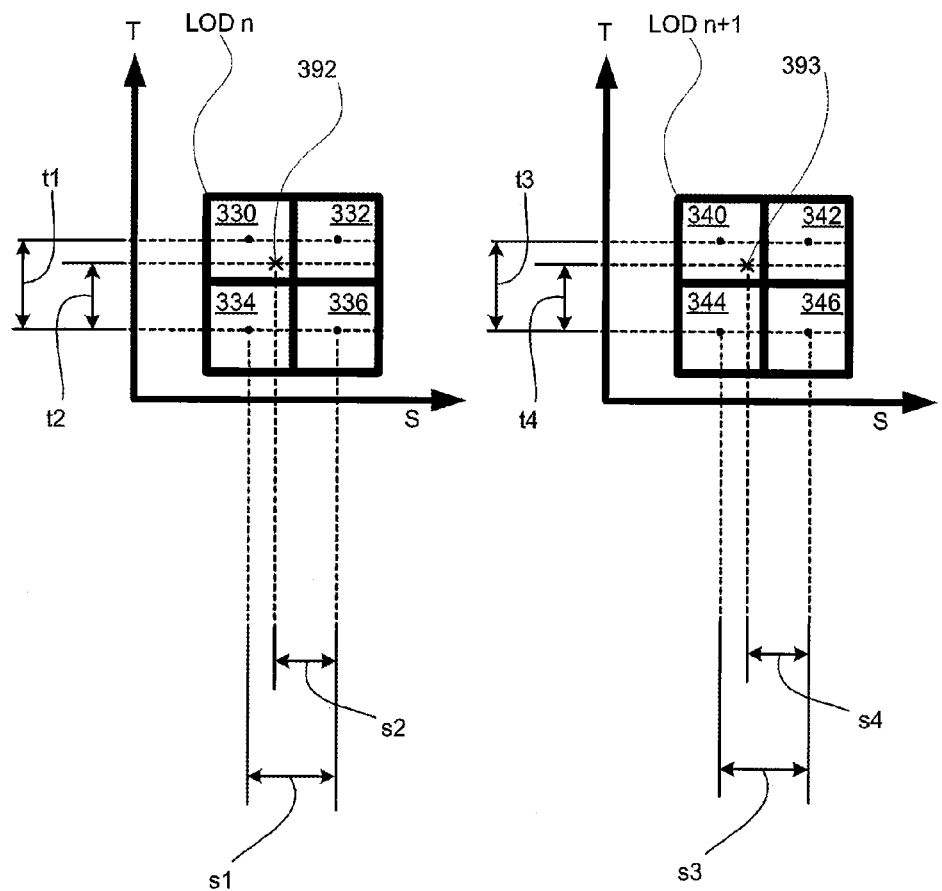
FIG. 3B illustrates a tri-linear sampling operation, according to one embodiment of the invention.

FIG. 3B illustrates a tri-linear sampling operation, according to one embodiment of the invention. Tri-linear sampling extends bilinear sampling by blending between LOD n and LOD n+1. Two sample points 392 and 393 are used to compute two bilinear sample values, as described above in FIG. 3A. Then, a third interpolation stage is added. The bilinear sample values associated with each of the two sample points 392 and 393 are interpolated in the third interpolation stage, according the LOD value of the pixel being filtered. When the LOD value is computed for a given pixel, an integer portion of the LOD computation defines the highest resolution LOD that should be used for texture mapping the pixel, and a fractional component of the LOD computation (LOD_frac) defines the relative contribution of each map resolution to the tri-linear sample value. Thus, when calculating the final sample value for the pixel, the bilinear sample value computed from texels 330-336 and associated with sample point 393 is weighted proportionally to LOD_frac, and the bilinear sample value computed from texels 340-346 and associated with sample point 392 is weighted proportionally to 1−LOD_frac.

Figure 3C:
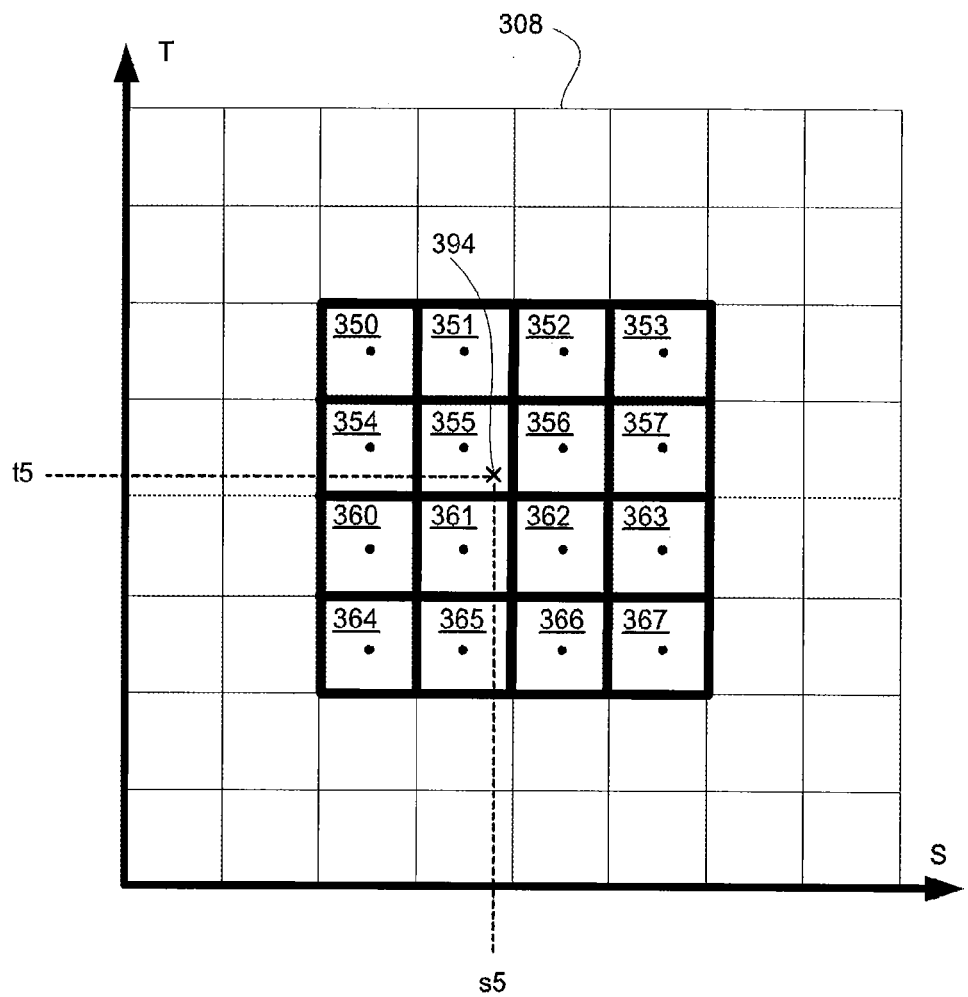
FIG. 3C illustrates a filter-4 sampling operation, according to one embodiment of the invention.

FIG. 3C illustrates a filter-4 sampling operation, according to one embodiment of the invention. A map image 308 includes a set of texels, such as texels 350-367, organized in a two-dimensional grid that includes a horizontal dimension of "s" and a vertical dimension of "t." A sample point 394 is taken at the horizontal position s5 and vertical position t5. The filter-4 sampling kernel covers a 4×4 set of texels, including texels 350 to 353, 354 to 357, 360 to 363 and 364 to 367. As is well-known, the filter-4 filter generates a value for the sample point 394 by computing a weighted sum over the 4×4 grid of samples. The filter-4 filter produces excellent image quality, even for magnified textures. However, the filter-4 filter uses four times as many texels as the bilinear filter, making the filter-4 filter a relatively expensive solution if applied broadly to all texture mapping operations.

For this reason, embodiments of the present invention contemplate using the filter-4 filter to texture map only those pixels that are magnified and more conventional filters, such as a bilinear filter, to texture map pixels that are minified. Such an approach is a compromise that provides improved image quality for magnified textures, while preserving overall system performance, since the additional bandwidth associated with the filter-4 filter only impacts magnified textures.

While the characteristics of a particular texture mapping filter determine the image quality of specific regions within an image, overall image quality may be substantially diminished by the presence of visual artifacts that appear between regions within an image. One such visual artifact arises from differences in focus within an image. For example, abrupt boundaries between regions of different levels of blurriness (or sharpness) within an image are very apparent to a human observer and therefore have the effect of diminishing overall image quality. Thus, if two different filter types are used to texture map the same object in a graphics image, as contemplated by embodiments of the present invention, then steps should be taken to reduce the contrast or artifacts in the object that may result from using two filter types. FIGS. 4 through 7 disclose three techniques for incorporating filter-4 filtering into a bilinear or tri-linear texture mapping system, whereby filter-4 filtering is used to improve the image quality of magnified textures, while simultaneously preserving overall image quality through a smooth transition between the different types of filters.

Figure 4:
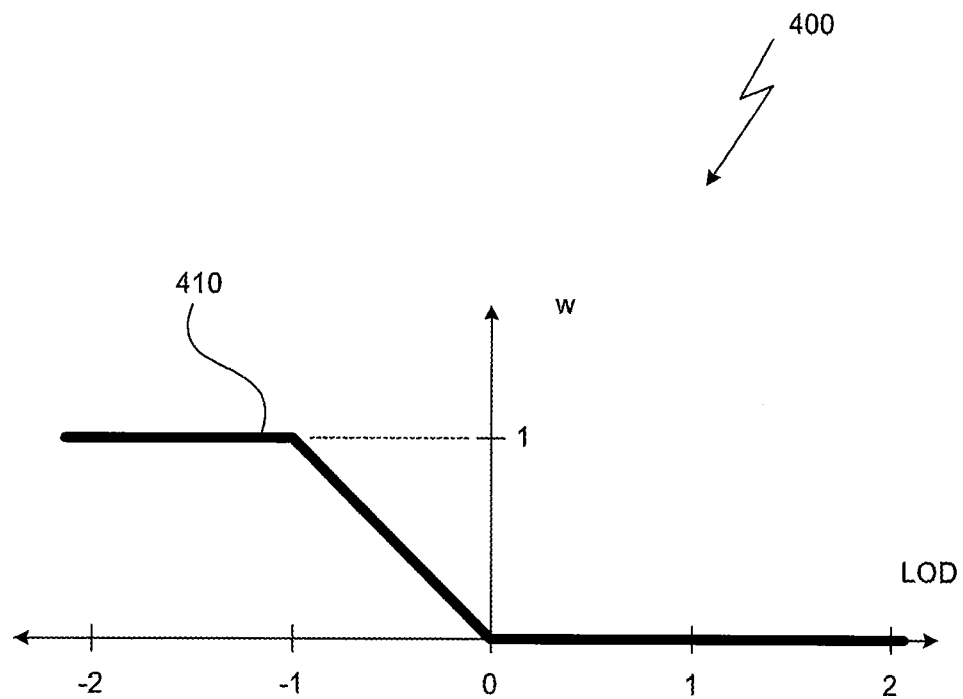
FIG. 4 illustrates a linear transition from bilinear sampling to filter-4 sampling, according to one embodiment of the invention.

FIG. 4 illustrates a linear transition from bilinear sampling to filter-4 sampling, according to one embodiment of the invention. As shown in graph 400, a function 410 establishes a piecewise-linear relationship between a computed LOD value and a weight value "w." The weight value determines the proportional contribution of a filter-4 sample to a tri-linear filtering operation, where LOD −1 indicates that the associated image map is magnified, and LOD 0 and above indicate that the associated image map is minified. When the weight value is zero and the LOD is greater than zero, a customary tri-linear filter is implemented, where two bilinear samples are computed and are then interpolated according to the LOD_frac value, as described above in FIG. 3B. However, when the weight value is non-zero, a filter-4 sample is computed and used in place of the lower LOD (LOD n of FIG. 3B) bilinear sample in the conventional tri-linear filtering operation. As the computed LOD value decreases from 0 to −1, the filter-4 sample contributes an increasing proportion of the final sample value, according to the function 410. In other words, the filter transitions from a bilinear-dominant sampling to a filter-4-dominant sampling as the LOD transitions from 0 to −1. When the computed LOD value is approximately less than or equal to −1, filtering operations are conducted using only the filter-4 filter. In one implementation, sampling below LOD 0 is performed by a single filter-4 operation with weights configured to emulate a bilinear filter at LOD 0 and a bi-cubic filter at LOD −1. As the LOD value ranges from 0 to −1, the sixteen filter-4 weights are linearly adjusted to scale from bilinear filtering to bi-cubic filtering. Additionally, the filter-4 hardware may detect when the current sampling operation closely matches filter-2 sampling and performs only a pure filter-2 filter function instead, thereby optimizing memory bandwidth and improving performance. Persons skilled in the art will recognize that transition thresholds other than 0 and −1 fall within the scope of the present invention. By smoothly transitioning to a filter-4 filter while the LOD transitions from 0 to −1 (where the LOD is increasingly magnified), artifacts related to using bilinear sampling on a magnified texture are minimized and overall image quality is improved.

Figure 5:
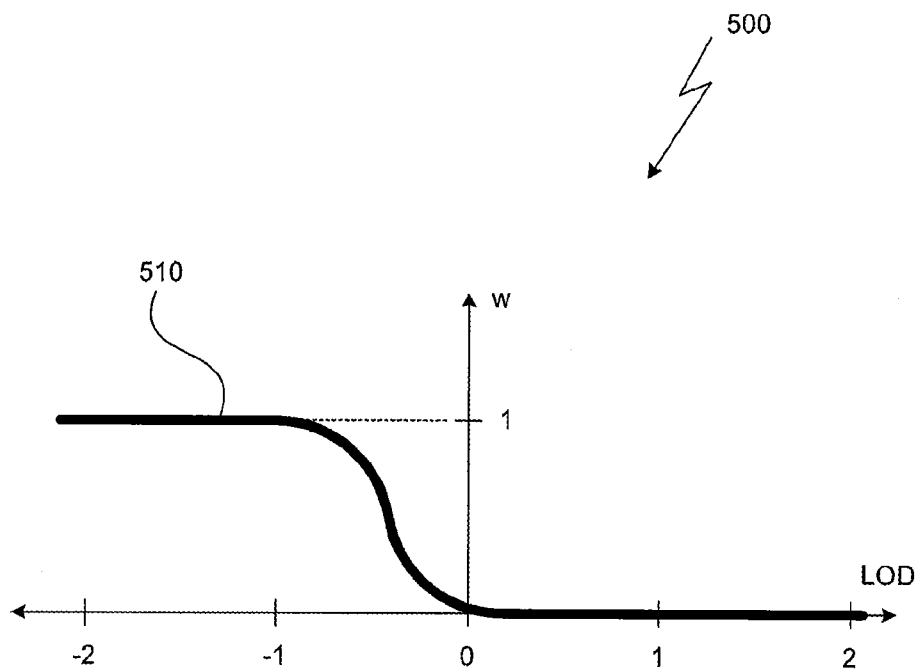
FIG. 5 illustrates a transition from bilinear sampling to filter-4 sampling using a lookup table, according to one embodiment of the invention.

FIG. 5 illustrates a transition from bilinear sampling to filter-4 sampling using a lookup table, according to one embodiment of the invention. As shown in graph 500, a function 510 establishes an arbitrary relationship between a computed LOD value and a weight value "w." This arbitrary relationship may be defined in a lookup table or using any other technically feasible technique. Again, the weight value determines the proportional contribution of a filter-4 sample to a tri-linear filtering operation, where LOD −1 indicates that the associated image map is magnified, and LOD 0 and above indicate that the associated image map is minified. When the weight value is zero and the LOD is greater than zero, a customary tri-linear filter is implemented, where two bilinear samples are computed and are then interpolated according to the LOD_frac value. However, when the weight value is non-zero, a filter-4 sample is computed and used in place of the lower LOD (again, LODn of FIG. 3B) bilinear sample. As the computed LOD value decreases from 0 to −1, the filter-4 sample contributes an increasing proportion to the final sample value, according to the function 510. In other words, the filter transitions from a bilinear-dominant sampling to filter-4-dominant sampling as the LOD transitions from 0 to −1. When the computed LOD value is approximately less than or equal to −1, filtering operations are conducted using only the filter-4 filter. In one implementation, sampling below LOD 0 is performed by a single filter-4 operation with weights configured to emulate a bilinear filter at LOD 0 and a bi-cubic filter at LOD −1. As the LOD value ranges from 0 to −1, the sixteen filter-4 weights are adjusted to scale from bilinear filtering to bi-cubic filtering according to a look-up table. Additionally, the filter-4 hardware may detect when the current sampling operation closely matches filter-2 sampling and performs only a pure filter-2 filter function instead, thereby optimizing memory bandwidth and improving performance. Persons skilled in the art will recognize that transition thresholds other than 0 and −1 fall within the scope of the present invention. By using a lookup table to guide the transition from bilinear to filter-4 filtering while the LOD transitions from 0 to −1 (where the LOD is increasingly magnified), artifacts related to using bilinear sampling on a magnified texture are minimized and greater control over the transition is possible.

Figure 6:
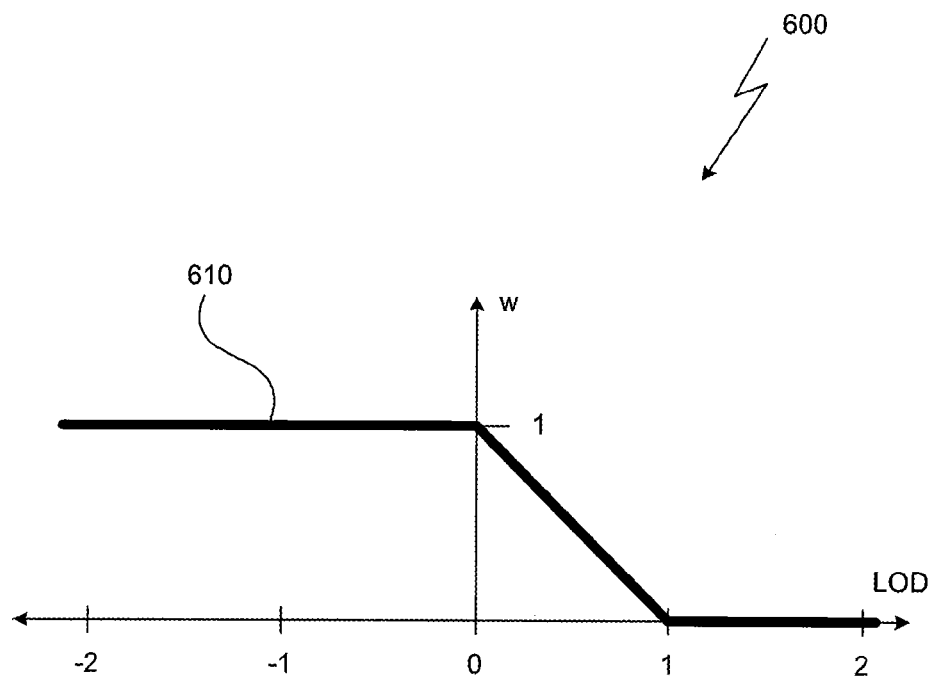
FIG. 6 illustrates a biased linear transition from bilinear sampling to filter-4 sampling, according to one embodiment of the invention.

FIG. 6 illustrates a biased linear transition from bilinear sampling to filter-4 sampling, according to one embodiment of the invention. As shown in graph 600, a function 610 establishes a piecewise-linear relationship between a computed LOD value and a weight value "w." Again, the weight value determines the proportional contribution of a filter-4 sample to a linear blending operation with a bilinear sample. When the weight value is zero and the LOD is greater than zero, a customary tri-linear filter is implemented, where two bilinear samples are linearly blended, according to the LOD_frac value. However, when the weight value is non-zero, a filter-4 sample is computed and used in place of the lower LOD (LOD n of FIG. 3B) bilinear sample. As the computed LOD value decreases from 1 to 0, the filter-4 sample contributes an increasing proportion to the final linear blended sample value, according to the function 610. In other words, the sampling function transitions from bilinear-dominant sampling to filter-4-dominant sampling as the LOD transitions from 1 to 0. When the computed LOD value is approximately less than or equal to 0, filtering operations are conducted using only the filter-4 filter. Persons skilled in the art will recognize that transition thresholds other than 1 and 0 fall within the scope of the present invention. By smoothly transitioning to a filter-4 filter while the LOD is still greater than 0 (the boundary between minified and magnified), artifacts related to using bilinear sampling on a magnified texture may be avoided all together.

Figure 7:
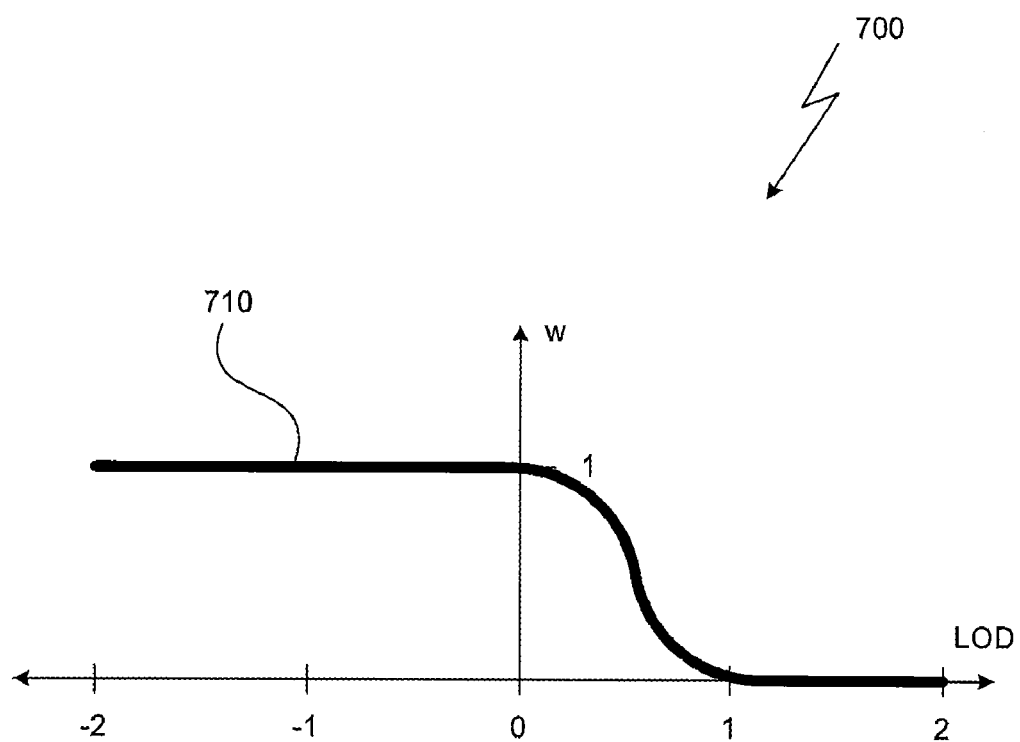
FIG. 7 illustrates a transition from bilinear sampling to filter-4 sampling using a lookup table, according to one embodiment of the invention.

FIG. 7 illustrates a transition from bilinear sampling to filter-4 sampling using a lookup table, according to one embodiment of the invention. As shown in graph 700, a function 710 establishes an arbitrary relationship between a computed LOD value and a weight value "w." Again, the weight value determines the proportional contribution of a filter-4 sample to a linear blending operation with a bilinear sample. When the weight value is zero and the LOD is greater than zero, a customary tri-linear filter is implemented, where two bilinear samples are linearly blended, according to the LOD_frac value. However, when the weight value is non-zero, a filter-4 sample is computed and used in place of the lower LOD (LOD n of FIG. 3B) bilinear sample. As the computed LOD value decreases from 1 to 0, the filter-4 sample contributes an increasing proportion to the final linear blended sample value, according to the function 710. In other words, the sampling function transitions from bilinear-dominant sampling to filter-4-dominant sampling as the LOD transitions from 1 to 0. When the computed LOD value is approximately less than or equal to 0, filtering operations are conducted using only the filter-4 filter. Persons skilled in the art will recognize that transition thresholds other than 1 and 0 fall within the scope of the present invention. By smoothly transitioning to a filter-4 filter while the LOD is still greater than 0 (the boundary between minified and magnified), artifacts related to using bilinear sampling on a magnified texture may be avoided all together.

The four methods for transitioning from a bilinear to a filter-4 filter discussed in FIGS. 4 through 8 may be implemented using any technically feasible technique. For example, a system based entirely on a filter-4 sampling engine may be used where the filter-4 sampling engine is populated with coefficients that emulate bilinear and tri-linear filtering with minified LOD values and bi-cubic filtering with magnified LOD values. Another implementation may use native bilinear sampling resources for minified LOD values a separate filter-4 sampling engine for performing filter-4 sampling for magnified LOD values.

Figure 8:
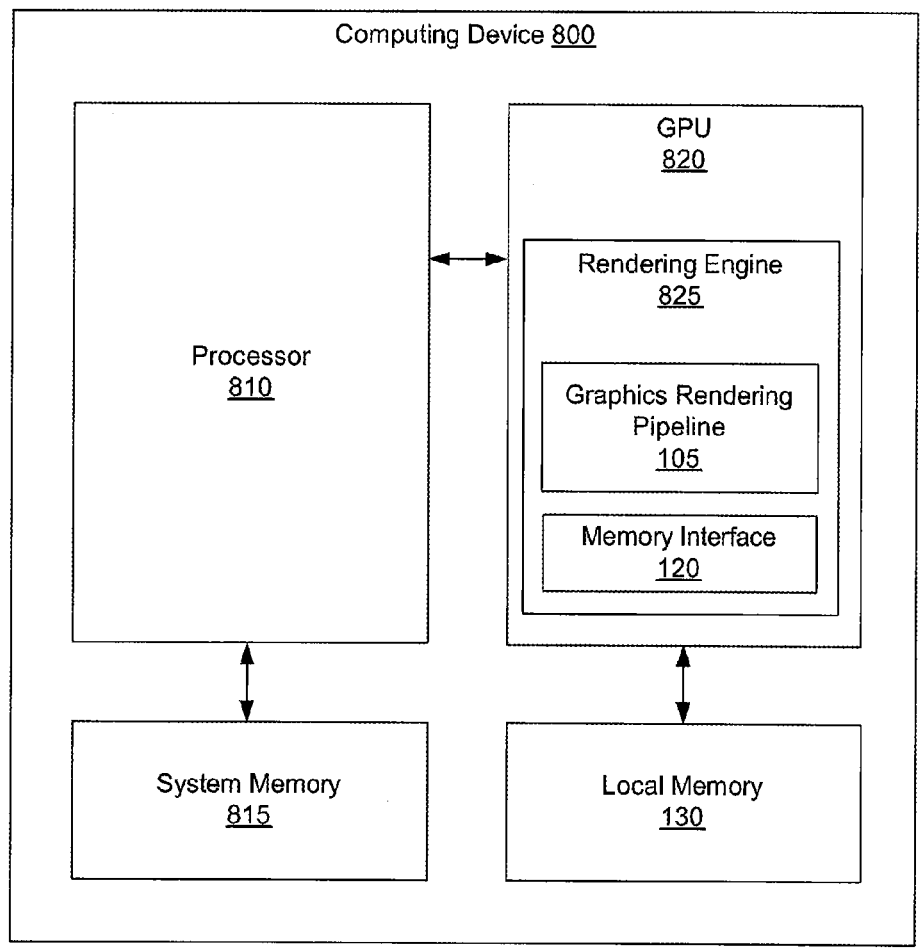
FIG. 8 is a conceptual diagram of a computing device configured to implement one or more aspects of the present invention.

FIG. 8 is a conceptual diagram of a computing device 800 configured to implement one or more aspects of the present invention. The computing device 800 includes, without limitation, a processor 810, system memory 815, a graphics processing unit (GPU) 820 and local memory 130 connected to the GPU 820. The GPU 820 includes at least one rendering engine 825 used to process data and at least one memory interface 120 used to access the local memory 130. The rendering engine 825 includes at least one graphics rendering pipeline 105 used to process data, as described above. Persons skilled in the art will recognize that any system having one or more processing units configured to implement the teachings disclosed herein falls within the scope of the present invention. Thus, the architecture of computing device 800 in no way limits the scope of the present invention.

In sum, a technique for transitioning smoothly from bilinear sampling to general filter-4 sampling is disclosed. The technique enables a transition from minified to magnified texture sampling while avoiding the visual artifacts commonly associated with a transition from one type of filter to a different filter. In one embodiment, when a pixel is minified, the equivalent of bilinear sampling is performed using a filter-4 texture mapping procedure, whereby the perimeter sample weights are set to zero to emulate bilinear sampling. As the level of detail progresses from minified to magnified, the filter-4 weights are interpolated from the bilinear weights to a set of general filter-4 weights. One set of general filter-4 weights defines a bi-cubic filter. Interpolating the filter-4 weights in this way can have the equivalent effect of interpolating between a bilinear and a bi-cubic filter as texture samples progress from minified to magnified. The result is a texture mapping technique that performs a smooth transition from bilinear to bi-cubic sampling. In another embodiment, the transition from bilinear to bi-cubic sampling starts when the level of detail is 1 and progresses to full filter-4 sampling at level of detail 0. In a different embodiment, the transition from bilinear to bi-cubic sampling starts when the level of detail is 0 and progresses to full filter-4 sampling at level of detail −1. Thus, by extending bilinear and tri-linear texture mapping techniques to incorporate a mechanism that smoothly transitions from bilinear filtering to filter-4 filtering for magnified texture maps, high image quality is maintained for texture mapped images that include pixels ranging from highly magnified through highly minified.

While the forgoing is directed to embodiments of the present invention, other and further embodiments of the invention may be devised without departing from the basic scope thereof. For example, aspects of the present invention may be implemented in hardware or software or in a combination of hardware and software. Further, even though in above description, bilinear sampling is used with minified image maps and filter-4 sampling is used the magnified image maps, persons skilled in the art will understand that any sampling technique conducive to minified image maps and any sampling technique conducive to magnified image maps may be implemented in the tri-linear filtering operations disclosed herein. Additionally, the specific LOD values used to initiate a transition between two filtering regimes may be biased in any fractional or integer amount according to the needs for a specific application and are not limited to the exemplary values of −1, 0 and 1 described herein. Therefore, the scope of the present invention is determined by the claims that follow.

We claim:

1. A system for performing a texture filtering operation, the system comprising:
   a memory configured to store a MIP map that includes a first image map that is a highest resolution image map within the MIP map; and
   a shader unit coupled to the memory and configured to:
      perform a first texture filtering operation using the first image map to compute a first sample value,
      perform a second texture filtering operation using the first image map to compute a second sample value, wherein the second texture filtering operation magnifies a texel within the first image map to cover multiple pixels and is a different type of texture filtering operation than the first texture filtering operation,
      determine that a level of detail (LOD) value indicates the first image map is associated with a minified LOD and the first image map is also associated with a magnified LOD, and
      blend the first sample value and the second sample value to produce a final sample value, wherein a first weight is assigned to the first sample value and a second weight is assigned to the second sample value based on the LOD value.

2. The system of claim 1, wherein the first texture filtering operation is a bilinear filtering operation that is performed with a bilinear filter kernel.

3. The system of claim 1, wherein the second texture filtering operation is a bi-cubic filtering operation that is performed with a filter-4 kernel.

4. The system of claim 1, wherein the minified LOD and the magnified LOD are one level of detail apart.

5. The system of claim 1, wherein the first weight and the second weight are linearly related.

6. The system of claim 1, wherein the first weight and the second weight are determined from a lookup table.

7. The system of claim 1, wherein the first weight and the second weight emulate a bilinear filter when the LOD value is greater than or equal to 0 and emulate a bi-cubic filter when the LOD value is less than or equal to −1.

8. The system of claim 1, wherein the first weight and the second weight emulate a bilinear filter when the LOD value is greater than or equal to 1 and emulate a bi-cubic filter when the LOD value is less than or equal to 0.

9. A computing device configured to perform a texture filtering operation, the computing device comprising:
  a memory configured to store a MIP map that includes a first image map that is a highest resolution image map within the MIP map; and
  a processing unit having a graphics rendering pipeline that includes a shader unit that is coupled to the memory and is configured to:
    perform a first texture filtering operation using the first image map to compute a first sample value,
    perform a second texture filtering operation using the first image map to compute a second sample value, wherein the second texture filtering operation magnifies a texel within the first image map to cover multiple pixels and is a different type of texture filtering operation than the first texture filtering operation,
    determine that a level of detail (LOD) value indicates the first image map is associated with a minified LOD and the first image map is also associated with a magnified LOD, and
    blend the first sample value and the second sample value to produce a final sample value, wherein a first weight is assigned to the first sample value and a second weight is assigned to the second sample value based on the LOD value.

10. The computing device of claim 9, wherein the first texture filtering operation is a bilinear filtering operation that is performed with a bilinear filter kernel.

11. The computing device of claim 9, wherein the second texture filtering operation is a bi-cubic filtering operation that is performed with a filter-4 kernel.

12. The computing device of claim 9, wherein the minified LOD and the magnified LOD are one level of detail apart.

13. The computing device of claim 9, wherein the first weight and the second weight are linearly related.

14. The computing device of claim 9, wherein the first weight and the second weight are determined from a lookup table.

15. The computing device of claim 9, wherein the first weight and the second weight emulate a bilinear filter when the LOD value is greater than or equal to 0 and emulate a bi-cubic filter when the LOD value is less than or equal to −1.

16. A method for performing a texture filtering operation, the method comprising:
  performing a first texture filtering operation using a first image map that is a highest resolution image map within the MIP map to compute a first sample value;
  performing a second texture filtering operation using the first image map to compute a second sample value, wherein the second texture filtering operation magnifies a texel within the first image map to cover multiple pixels and is a different type of texture filtering operation than the first texture filtering operation;
  determine that a level of detail (LOD) value indicates the first image map is associated with a minified LOD and the first image map is also associated with a magnified LOD;
  blending the first sample value and the second sample value to produce a final sample value, wherein a first weight is assigned to the first sample value and a second weight is assigned to the second sample value based on the LOD value; and
  processing the final sample value to produce rendered image data that is suitable for display and is stored in a memory.

17. The method of claim 16, wherein the first texture filtering operation is a bilinear filtering operation that is performed with a bilinear filter kernel, and the second texture filtering operation is a bi-cubic filtering operation that is performed with a filter-4 kernel.

18. The method of claim 16, wherein the minified LOD and the magnified LOD are one level of detail apart.

19. The method of claim 16, wherein the first weight and the second weight are linearly related or are determined from a lookup table.

20. The method of claim 16, wherein the first weight and the second weight emulate a bilinear filter when the LOD value is greater than or equal to 0 and emulate a bi-cubic filter when the LOD value is less than or equal to −1.

* * * * *